Dec. 12, 1939.  F. MANZ ET AL  2,182,926

POWER-DRIVEN HAND-GUIDED MACHINE

Filed Sept. 27, 1937

Inventors
Friedrich Manz
Karl Rosenfelder
by Roy F. Steward
their attorney

Patented Dec. 12, 1939

2,182,926

UNITED STATES PATENT OFFICE 2,182,926

POWER-DRIVEN HAND-GUIDED MACHINE

Friedrich Manz, Halle-on-the-Saale, and Karl Rosenfelder, Stuttgart, Germany, assignors to Robert Bosch Gesellschaft mit beschrankter Haftung, Stuttgart, Germany Application September 27, 1937, Serial No. 165,962
In Germany September 30, 1936

11 Claims. (Cl. 64—30)

The present invention relates to power-driven hand-guided portable machine tools.

In the friction clutches usually adapted in power-driven hand-guided machines the clutch linings bear upon each other during operation under the steady unvarying pressure of helical springs. The maximum torque transmissible by such a clutch depends, however, not only on the degree of this pressure, but also on the value of the frictional resistance which diminishes as the relative speed of the parts of the clutch, which slide on each other, rises and is greatest by far during relative rest between them. In such machines, at the moment when the clutch is disengaged (when, for instance a driven drill, in penetrating through a wall to be drilled, suddenly encounters increased drilling resistance and stops), the clutch faces must be brought from the condition of relative rest into the condition in which they slide on each other, which as above stated requires a specially high peak torque. This peak torque manifests itself in portable hand-tool machines by the machine exerting a reaction or kick corresponding to the peak of the torque on the hand of the operator holding it. Owing to this kick the machine very often slips from the hand of the operator, or throws him to the ground, if he is gripping it firmly and is not prepared for the shock. In high and unprotected working places, for instance on lofty steel frame buildings, this circumstance has even resulted in fatal falls. Consequently operators are nervous and fail to apply pressure correctly on their machines which considerably adversely affects the result of the work.

An object of the present invention is to overcome this serious defect of known power-driven hand-guided machines, and to provide a power-driven hand-guided portable machine tool in which a clutch comprising a set of plates or lamellae normally held in contact between end members operating under a resilient load is built in between the motor and the gearing, and a control device or nut is provided between the clutch and the driven shaft of the machine, which nut bears against both end members at its ends and has a rigid connection with the clutch in the direction of rotation but is adjustable on the shaft by a thread of quick pitch, whereby on the torque exceeding a predetermined amount, the nut is moved to displace one of the members against the loading pressure and thus separate the plates of and relieve the clutch.

Another object of the invention is to further improve the construction of the clutch and particularly the mounting and arrangement of the springs for pressing the end members or plates together. It has been found that, where springs are used in friction clutches to resiliently urge the friction discs or plates together, the springs tend to overheat, due to frictional heat, with the result that they tarnish, become soft, and lose their resiliency. According to the present invention the above noted objections are overcome by providing a power-driven hand-guided portable machine tool having a friction clutch of the type described in which means for generating a cooling air current are provided and the plate pressure springs are arranged in such a position adjacent the circumference of the plates that they are exposed to the cooling air current as the clutch revolves so that overheating of the springs is prevented.

By the clutch control device mentioned the clutch is positively relieved when a definite harmless maximum torque is exceeded independently of the fluctuating value of the friction co-efficient, so that independently of the momentary relative speed of the clutch parts at the moment of the increased torque, the halves of the clutch slip relative to each other when the predetermined torque occurs. The peak torques above mentioned cannot occur on the movement of the clutch halves which have been quietly bearing on each other. The known control devices of this kind have hitherto only been provided for use with apparatus in which the described serious consequences existing in power-driven hand-guided machines cannot occur. It is precisely due to the fact that in power-driven hand-guided portable machines the operator has to apply the counter-torque for the machine, that the employment of the control device mentioned in portable hand-tool machines results in the unexpected improvement, that for the first time the operator can firmly hold the machine in the hand, even high power machines, with a freedom from care, and need fear no recoil or kick. Furthermore, in the known control device of the kind referred to an important circumstance has been overlooked, namely that in those clutches having a control device this is provided between the motor and clutch, and further, the outer plates are connected to the gear side of the shaft. This has however the considerable drawback, which in certain circumstances even annuls the action of the control device, that the casing with its large dimensions necessary for supporting the outer plates must be braked on the sudden occurrence of a resistance to rotation. In this way, in spite of the control device provided in the known arrangements, quite considerably recoil shocks can still occur.

Applied to the case of the power-driven hand-guided portable machine, that would mean that the operator even now has still to reckon on recoils, and further that the saving of the gearing also intended in the invention with the arrangement of the control device is not attained. The position of the control device provided according to the invention, and its connection with the plates or lamellae, is of great importance in power-driven hand-guided portable machine tools, especially in view of the very high speeds here employed (up to 15,000 revolutions per minute).

The invention can also be applied to machines which are adapted both for left and right hand rotation.

One form of construction of the present invention is shown by way of example in the accompanying drawing, in which.

Figure 1:
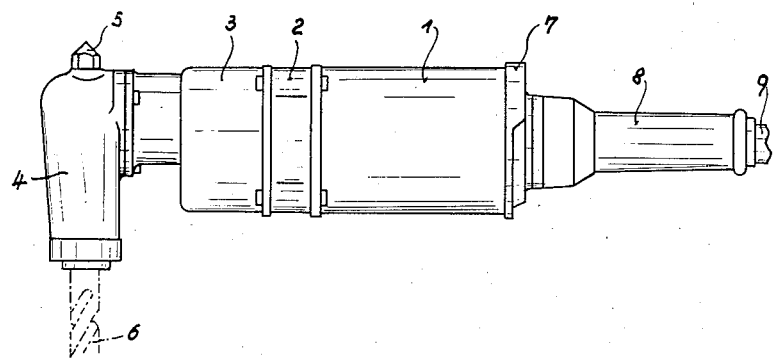
Figure 1 is a view of an angle drilling machine on which the invention is carried out.

The motor casing is constructed in two parts shown by 1 and 2. The casing 3 of the drive is connected with the part 2. To the casing 3 of the drive is flanged the actual head 4, out of which projects a feed screw 5, which, abutting against a support, ensures the feeding of a drill 6, by rotating. On the end of the motor casing remote from the tool, a bearing cover 7 is applied. At this end is also fitted a handle in which is lodged the "on and off" switch for the electromotor. The electric lead 9 enters the handle at the rear end of this.

Within the motor casing 1 is fitted a stationary plate pack 9a, the windings of which are indicated by 10. The rotor 11 which in the example of construction is constructed as a short-circuited armature, is fixed on a hollow shaft 12, which is mounted at the handle end in the bearing cover 7, and at the tool end directly on a shaft 13 passing within it. This shaft 13 which is solid and is also mounted at the handle end in the bearing cover 7, but at the tool end in a bearing formed in the casing part 2. The momentum of the rotor 11 is transmitted by the hollow shaft 12 on to the solid shaft 13 by means of the plate clutch described below.

One half 14 of the clutch is keyed on to the hollow shaft 12 at the tool end thereof, and has fan blades 14a adjacent its periphery. When the motor revolves, these blades force the air, which they draw in through the motor and through holes (not shown) in the rear casing, radially outwards in the direction of the arrow through bores 1a in the casing part 1. Nearer the tool, additional lugs 14b are provided on the clutch half 14, one of these lugs being shown in the upper half of Figure 2. Transversely through each of these lugs 14b there passes a bolt 15. The lugs 14b serve at the same time for the entraining of clutch plates 16 which engage within notches in their outer circumference. These plates 16 lie between further clutch plates 17, which in turn are carried in notches of projections 18a on the circumference of a ring or nut 18 constituting a control member or device. This ring or nut 18 engages with a multiple thread 13a of quick pitch which is provided on the shaft 13.

Figure 2:
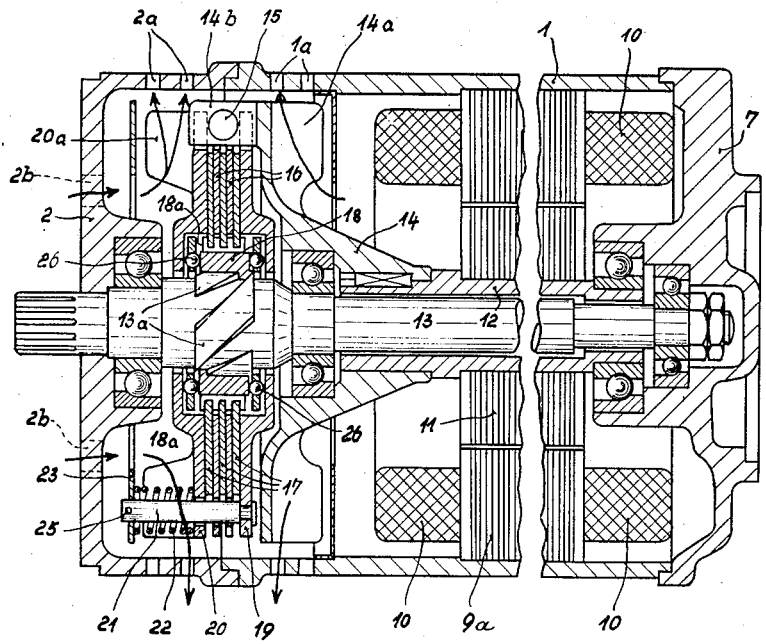
Figure 2 is a longitudinal section through the motor part of the angle drilling machine of Fig. 1 on an enlarged scale.

The pressing together of the plates 16, 17 which is necessary for the transmission of the rotary momentum is effected by springs 22, of which one is shown in the lower half of Fig. 2. On both sides of the plate pack are provided pressure plates 19 and 20, which are both movable in an axial direction. On the plate 19 bolts 21 for guiding the springs 22 are rigidly secured near the outer periphery of the plate and parallel to the shaft said bolts passing through the plate 20. The springs 22 are gripped between the plate 20 and an annular disc 23 slotted so as to be passed over the bolts 21 and is held thereon by pins 25. In the construction described, the springs 22 thus press the plates 16 and 17 together by means of the pressure applied to the plates 20 and 19. Fan blades 20a are provided on the pressure plate 20 and on revolving, said blades induce air from the tool end through holes 2b and force it radially outwards through holes 2a in the casing part 2. By means of the air current thus produced, which travels in the direction shown by the arrow, the springs 22, which cut through this air current on revolving, are powerfully cooled.

The whole pack, consisting of the plates 19 and 20, the clutch plates 16 and 17, and the springs 22, is secured against axial displacement by the bolts 15, which act as stops to limit movement of pressure plates 19 and 20, one toward the other. Thrust blocks 26 are placed between the ring 18 and the pressure plates 19 and 20. The clutch described works as follows:—

When the rotor 12 is in action, rotary momentum is transmitted via the hollow shaft 12, the clutch half 14, the lugs 14b, the clutch plate 16, clutch plate 17, the ring 18 and the threaded ribs 13a on to the shaft 13. This transmission, however, is only possible up to a certain maximum rotary momentum or torque. If this rotary momentum or torque is exceeded, as, for example, when the drill encounters increased drilling resistance and stops, then the control member or ring 18 mounted on the threaded ribs 13a presses, according to the direction of rotation of the motor, either to the left or to the right, with such a force that the ring displaces the right or left pressure plate 19 or 20 against the operation of the springs 22 by means of the thrust blocks 26, so that, since the other pressure plate cannot follow this movement on account of the bolt 15, the applied pressure is taken from the clutch plates and thus the transmission of rotary momentum is interrupted.

We declare, that what we claim is:

1. In a power-driven hand-guided portable machine tool comprising a driving shaft, a driven shaft connected to the tool, and a clutch operatively inserted between said shafts and comprising driving and driven clutch members, axially acting resilient members pressing together the clutch members for frictionally connecting them, and an intermediate ring inserted between the driven clutch members and said driven shaft, said ring having a direct rigid connection with said driven clutch members in the direction of rotation but being loosely connected thereto in the axial direction, said ring being directly and drivably connected to said driven shaft but being axially adjustable thereon by a threaded connection therewith having a thread of quick pitch whereby said ring causes axial movement of one of said axially acting resilient members to release the clutch when the torque exceeds a predetermined amount.

2. In a power-driven hand-guided portable machine tool comprising a driving shaft, a driven shaft connected to the tool, and a disc clutch operatively inserted between said shafts and comprising a pair of axially movable end plates, a set of driving and driven plates or lamellae mounted therebetween, resilient means pressing said end plates and clutch plates together to frictionally connect said clutch plates, and an intermediate ring having a direct rigid connection with the driven clutch plates in the direction of rotation but being loosely connected thereto in the axial direction, said ring being directly and drivably connected to said driven shaft but being axially adjustable thereon by a threaded connection therewith having a thread of quick pitch whereby said ring presses against and causes relative axial movement of said end plates to release the clutch when the torque exceeds a predetermined amount.

3. In a power-driven hand-guided portable machine tool as set out in claim 2 including stop means for limiting movement of either end plate toward the other.

4. In a power-driven hand-guided portable machine tool as set out in claim 2 including a hollow driving shaft which drives the driven shaft through said clutch, said driven shaft being rotatably mounted in said hollow shaft.

5. In a power-driven hand-guided portable machine tool as set out in claim 2 including a casing enclosing said clutch and provided with openings for flow of air therethrough, said clutch being provided with means for inducing a cooling current of air through said openings and in contact with said clutch.

6. In a power-driven hand-guided portable machine tool as set out in claim 2 in which the resilient means comprises a plurality of springs arranged adjacent the periphery of the plates and projecting laterally out from said clutch whereby substantially the entire length of each spring projects out into and is freely accessible and exposed to cooling air when the clutch rotates.

7. In a power-driven hand-guided portable machine tool as set out in claim 2 in which one of said end plates is provided adjacent its periphery with a plurality of laterally-extending guide bolts disposed parallel to the axis of rotation of said clutch, and the second end plate is provided with a plurality of openings through which said bolts loosely project, a disc secured to the projecting ends of said bolts, said resilient means comprising tension springs, one of which is mounted on each bolt between said disc and said second end plate whereby said springs project laterally out from said clutch whereby substantially the entire length of each spring projects out into and is freely accessible and exposed to cooling air when the clutch rotates.

8. In a power-driven hand-guided portable machine tool as set out in claim 2 in which one of said end plates is provided adjacent its periphery with a plurality of laterally-extending guide bolts disposed parallel to the axis of rotation of said clutch, and the second end plate is provided with a plurality of openings through which said bolts loosely project, a disc secured to the projecting ends of said bolts, said resilient means comprising tension springs, one of which is mounted on each bolt between said disc and said second end plate whereby said springs project laterally out from said clutch whereby substantially the entire length of each spring projects out into and is freely accessible and exposed to cooling air when the clutch rotates, said second end plate being provided with fan blades arranged to project a stream of cooling air radially against said springs.

9. In a power-driven hand-guided portable machine tool comprising a drive shaft, a driven shaft connected to the tool, and a friction clutch connecting said drive and driven shafts and comprising driving and driven friction clutch members, resilient means normally pressing said clutch members together in clutched relation, one of said shafts being provided with an externally threaded portion having a quick thread, an internally threaded control member mounted on the externally threaded portion of said shaft whereby said control member is drivably connected to but axially adjustable on said shaft, a portion of said clutch members being loosely connected to said control member for free axial movement relative thereto but being secured against relative rotary movement and the remainder of said clutch members being connected to the other shaft for rotation therewith, said control member being axially movable to release the pressure on said clutch members and release the clutch when the load on said driven shaft exceeds a predetermined amount.

10. In a power-driven hand-guided portable machine tool comprising a drive shaft, a driven shaft connected to the tool, and a friction clutch connecting said drive and driven shafts and comprising a pair of pressure plates, driving and driven friction clutch plates therebetween, spring means normally pressing said plates together, said driven shaft being provided with an externally threaded portion having a quick thread, an internally threaded control member mounted on the externally threaded portion of said shaft and between said pressure plates whereby said control member is drivably connected to but axially adjustable on said driven shaft, said driven clutch plates being loosely connected to said control member for free axial movement relative thereto but being secured against relative rotary movement and said driving clutch plates being loosely connected to the drive shaft for free axial movement relative thereto but being secured against relative rotary movement, said control member being axially movable to separate said pressure plates and release said clutch when the load on said driven shaft exceeds a predetermined amount.

11. In a power-driven hand-guided portable machine tool comprising a rotatable driving member, a rotatable driven member connected to the tool, a plurality of friction clutch members, means for connecting a portion of said clutch members for rotation with and axial movement relative to said driving member, means for connecting the other portion of said clutch members for rotation with and axial movement relative to said driven member, resilient means normally pressing said clutch members together into frictional driving contact, one of such connecting means including a control ring drivably connected to one of said rotatable members but being axially adjustable thereon by a threaded connection having a thread of quick pitch, one portion of said clutch members being loosely connected directly to said control ring for free axial movement relative thereto but being secured against relative rotary movement, said control ring being axially movable to release the pressure on said clutch members and permit relative rotation between the driving and driven clutch members when the load on said driven member exceeds a predetermined amount.

FRIEDRICH MANZ.
KARL ROSENFELDER.